United States Patent [19]
Wood et al.

[11] Patent Number: 5,739,947
[45] Date of Patent: Apr. 14, 1998

[54] NONLINEAR OPTICAL POWER LIMITER USING SELF-TRAPPING OF LIGHT

[76] Inventors: Gary L. Wood, 7419 Larne La., Lorton, Va. 22079; Edward J. Sharp, 11404 Indian Head Hgwy., Fort Washington, Md. 20744; Richard R. Shurtz, 3319 Cranbrook Ct., Oakton, Va. 22124

[21] Appl. No.: 742,081

[22] Filed: Mar. 25, 1985

[51] Int. Cl.[6] .................................................. G02F 1/35
[52] U.S. Cl. .................. 359/299; 359/244; 359/885; 385/5; 372/21
[58] Field of Search ........................ 350/312, 354, 350/359, 363, 267, 168, 356; 332/7.51; 372/703, 21; 359/244, 299, 885; 385/5

[56] References Cited

U.S. PATENT DOCUMENTS

| | | | |
|---|---|---|---|
| 3,458,249 | 7/1969 | George | 350/354 |
| 3,814,503 | 6/1974 | Milam | 332/7.51 |
| 3,999,144 | 12/1976 | Bret | 350/354 |
| 4,003,631 | 1/1977 | Biet et al. | 350/359 |
| 4,410,239 | 10/1983 | Kaplan et al. | 350/354 |
| 4,597,639 | 7/1986 | Seitel et al. | 350/363 |

OTHER PUBLICATIONS

Bohnert et al., "Plasma Induced Optical . . . ", 1984, pp. 263–272, Z. Phys. B., Condensed Matter, 57.
Soileau et al, "On Self Focusing and Spot-Size . . . ", Oct. 1, 1980, pp. 385–393, NBS–SP–620, Boulder, CO.
Smith et al, "Nonlinear Optical . . . Behavior", Jan. 1984, IEEE J.Q.E., vol. QE–20, #1, pp. 30–36.
Ripin et al, "Picosecond Optical Gate", Jul. 1977, pp. 935–937, Rev. Sci. Inst., vol. 48, #7.

*Primary Examiner*—Nelson Moskowitz
*Attorney, Agent, or Firm*—Milton W. Lee; Aubrey J. Dunn; Anthony T. Lane

[57] ABSTRACT

Incident radiation is focussed by a lens into a non-linear optical material whose index of refraction increases with increased radiation intensity. For normal radiation, the radiation freely passes through the nonlinear optical and an optically-switchable material to an other lens. This other lens directs the radiation onto a photodetector. High-intensity radiation, however, is self-trapped in the nonlinear material to form a columnar beam which falls on the optically-switchable material, causes this material to switch, and is reflected thereby.

4 Claims, 1 Drawing Sheet

NONLINEAR OPTICAL POWER LIMITER USING SELF-TRAPPING OF LIGHT

The invention described herein may be manufactured, used, and licensed by the U.S. Government for governmental purposes without the payment of any royalties thereon.

BACKGROUND OF THE INVENTION

This invention is in the field of optical power limiters, ie., devices which limit the power or intensity of light which falls on a sensitive photodetector. These limiters have received much attention of late because of the increasing use of sensitive optical detectors, such as image intensifiers and infrared detectors, by the armed services of the United States. Because of their sensitivites, such detectors are susceptable to damage by countermeasures of potential enemies. These countermeasures include both visible and infrared lasers with high-intensity beams; such lasers are now readily available in portable embodiments. Moreover, the human eye is another sensitive photodetector susceptable to damage from laser countermeasures. Optical power limiters fall into two distinct categories. One category is intrinsic limiters, which are self-activated by high-intensity radiation, and hybrid devices, which cannot act alone, but which require some sort of electrical signal to operate. Examples of intrinsic limiters are: Fabry-Perot interference filters tuned to the wavelength of expected high-intensity countermeasures, saturable dyes, etc. Some hybrid devices are electro-optical modulators such as Kerr and Pockel cells. Unfortunately, most intrinsic limiters are restricted in the amount of power that they can absorb or reflect and still be wideband. Hybrid limiters are likewise so restricted, and additionally, are more complex. The instant invention is intrinsic and broadband and is able to handle high-power laser countermeasures.

SUMMARY OF THE INVENTION

The invention is an optical power limiter including a cell into which incoming radiation is focussed. The cell contains a non-linear medium that transmits normal radiation essentially unrefracted, but which allows self-trapping of high-intensity radiation. The back of the cell contains an optically switchable material which is transparent to normal radiation and allows such radiation to fall on a photodetector, but which acts as a diffuse reflector of self-trapped, high-intensity radiation.

DETAILED DESCRIPTION OF PREFERRED EMBODIMENT

Figure 1:
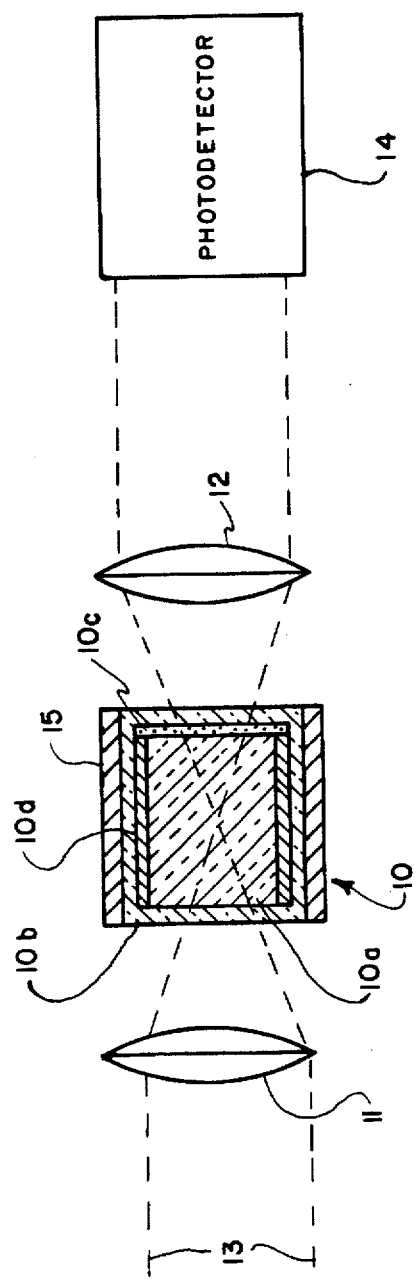
FIG. 1 is a schematic/partial cross-sectional representation of the inventions for normal radiation.

This description may be best understood when taken in conjunction with the drawings. Referring to FIG. 1, the invention is composed of three primary parts: radiation-limiting cell generally designated 10, and lenses 11 and 12. Incident radiation, such as rays 13, are focussed by lens 11 into optical medium 10a contained in cell housing 10b. The rays pass through a focal point and exit through a layer of optically switchable material (OSM) 10c to lens 12. This lens collects the rays and directs them onto photodetector 14. It is assumed that the radiation of rays 13 is normal scene radiation, i.e., is not high-intensity radiation as from a countermeasure laser. Optical medium 10a is preferably a nonlinear optical fluid whose index of refraction increases with increasing light intensity. Typical examples of such a fluid are: $CS_2$, nitrobenzene, $CCl_4$, and toluene, ether, and ethanol. The OSM may be a plasma-forming material such as AgBr, or an insulator-to-metal transition material such as $VO_2$ or SmS.

Figure 2:
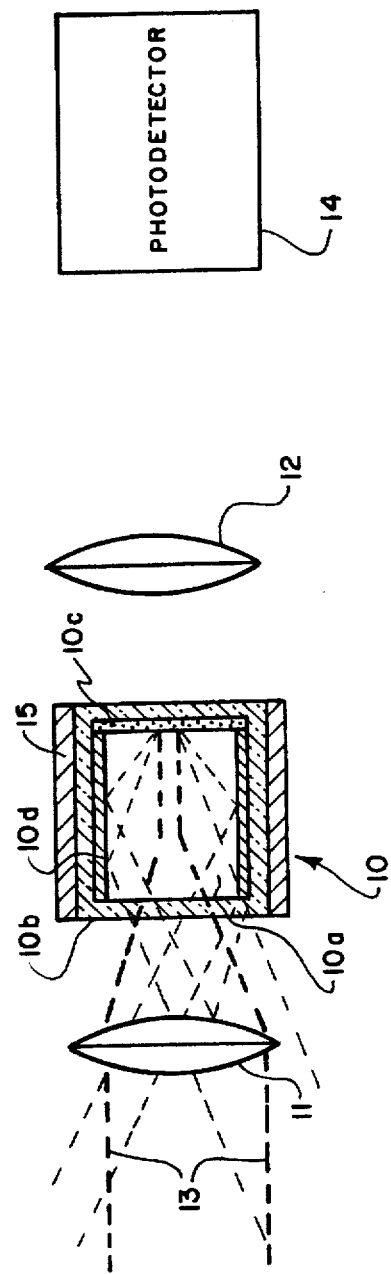
FIG. 2 is a similar representation, for high-intensity radiation.

Referring now to FIG. 2, high-intensity radiation indicated by rays 13 is focussed by lens 11 into material 10a. This time, however, the radiation does not readily pass through 10a, but is self-trapped into a substantially columnar beam. When this beam strikes the OSM, its intensity is sufficient to induce switching of OSM layer 10c. If 10c is a plasma forming material, there exists a predetermined intensity above which the material forms a reflective plasma by an increase in free electrons in the material. For insulator-to-metal transition materials, high-intensity radiation causes the materials to switch from a transparent to a reflective state. In order to facilitate transition between states, it may be necessary to heat the cell with heater 15 to place the OSM at a temperature (or pressure) just below its switching value. This will make the OSM more sensitive to incoming radiation intensity. When OSM layer 10c switches, the radiation which caused the switching is diffusively reflected by 10c. The inner walls of 10 may be lined with a reflective material 10d, or an absorber may be used. Although it has not been mentioned, it should be understood that high-intensity radiation will cause surface ablation of 10a when 10a is a plasma forming material. The example of high-intensity radiation in FIG. 2 is for a laser beam on the optical axis of the device, and ablation of 10c occurs at the center of 10c. For off-axis high-intensity radiation, this radiation will be self-trapped off the device optical axis, and will ablate 10c off-center. Since 10c is not in the device virtual focal plane, damage spots on 10c do not effect system performance, i.e., do not significantly degrade image quality at photodetector 14.

We claim:

1. An optical device for protecting a sensitive photodetector from the high-intensity portion of radiation including optical scene radiation and high-intensity radiation, wherein said device includes:

a radiation-limiting cell;

a first lens for focussing radiation to a focal point in said cell;

a second lens for collecting radiation passing through said cell and directing such radiation onto said photodetector, wherein said cell includes an optical medium whose index of refraction is dependent on radiation intensity such that radiation equal to or greater than a predetermined intensity level is self-trapping in said medium and further includes an optically-switchable material between said medium and said second lens and which acts as a diffuse reflector for radiation equal to or greater than an other predetermined intensity level; whereby radiation of an intensity less than said predetermined intensity level is focussed to said focal point by said first lens, passes through said optically-switchable material, and is collected and focussed onto said photodetector by said second lens; and whereby radiation of an intensity equal to or greater than said predetermined intensity is self-focussing in said optical medium such that its image at said focal point is trapped in said medium and falls on said optically-switchable material essentially at said image size and at an intensity equal to or greater than said other predetermined intensity level and is thus diffusivly reflected by said optically-switchable material.

2. The device as set forth in claim 1 wherein said optical medium whose index of refraction is directly related to radiation intensity.

3. The device as set forth in claim 1 wherein said optically-switchable material is a plasma-forming material.

4. The device as set forth in claim 1 wherein said optically-switchable material is an insulator-to-metal transition material.

* * * * *